United States Patent
Everett et al.

(10) Patent No.: US 8,868,302 B2
(45) Date of Patent: Oct. 21, 2014

(54) SYSTEM FOR AUTONOMOUS PATH PLANNING AND MACHINE CONTROL

(75) Inventors: Bryan J. Everett, Peoria, IL (US); Andrew J. Vitale, Peoria, IL (US); Craig L. Koehrsen, East Peoria, IL (US); James D. Humphrey, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 595 days.

(21) Appl. No.: 13/198,428

(22) Filed: Aug. 4, 2011

(65) Prior Publication Data

US 2012/0136524 A1 May 31, 2012

Related U.S. Application Data

(60) Provisional application No. 61/418,335, filed on Nov. 30, 2010.

(51) Int. Cl.
*G05D 1/00* (2006.01)
*E02F 9/20* (2006.01)
*G05D 1/02* (2006.01)

(52) U.S. Cl.
CPC .......... *G05D 1/0291* (2013.01); *G05D 1/0274* (2013.01); *E02F 9/2045* (2013.01); *E02F 9/2054* (2013.01); *G05D 2201/0202* (2013.01)
USPC ............. 701/50; 701/408; 701/410; 701/411; 701/422

(58) Field of Classification Search
CPC ....... G05D 1/00; G05D 1/021; G05D 1/0212; G05D 1/0217; G05D 1/0276; G05D 1/0287; G05D 1/0291
USPC ................ 701/50, 408, 410, 411, 422; 172/1; 700/253, 250
See application file for complete search history.

(56) References Cited

U.S. PATENT DOCUMENTS

| 4,600,999 A | 7/1986 | Ito et al. |
| 4,986,384 A | 1/1991 | Okamoto et al. |

(Continued)

FOREIGN PATENT DOCUMENTS

| EP | 1571515 | 9/2005 |
| GB | 2448972 | 11/2008 |

OTHER PUBLICATIONS

U.S. Patent Application of Bryan J. Everett et al. entitled "Machine Control System Having Autonomous Dump Queuing" filed Aug. 4, 2011.

(Continued)

*Primary Examiner* — Thomas G Black
*Assistant Examiner* — Sara Nelson
(74) *Attorney, Agent, or Firm* — Finnegan, Henderson, Farabow, Garrett & Dunner LLP

(57) ABSTRACT

A control system is disclosed for use with a mobile loading machine operating at a first location and a plurality of mobile haul machines configured to move material received at the first location to a second location. The control system may have a plurality of control modules, each associated with one of the mobile loading machine and the plurality of mobile haul machines, and a worksite controller. The worksite controller may be configured to make a determination that a position of the mobile loading machine has changed, and to generate a new travel path for the plurality of mobile haul machines based on the determination. The worksite controller may also be configured to selectively communicate the new travel path to each of the plurality of control modules. The new travel path between the first and second locations may be automatically determined in accordance with at least one user-selected goal.

16 Claims, 2 Drawing Sheets

(56) References Cited

U.S. PATENT DOCUMENTS

| | | | |
|---|---|---|---|
| 5,005,652 A | 4/1991 | Johnson | |
| 5,375,663 A | 12/1994 | Teach | |
| 5,586,030 A | 12/1996 | Kemner et al. | |
| 5,850,341 A * | 12/1998 | Fournier et al. | 701/50 |
| 5,913,914 A | 6/1999 | Kemner et al. | |
| 5,925,081 A | 7/1999 | Hawkins et al. | |
| 5,931,875 A | 8/1999 | Kemner et al. | |
| 5,961,560 A | 10/1999 | Kemner | |
| 6,128,574 A | 10/2000 | Diekhans | |
| 6,216,071 B1 * | 4/2001 | Motz | 701/50 |
| 6,236,924 B1 | 5/2001 | Motz et al. | |
| 6,246,932 B1 | 6/2001 | Kageyama et al. | |
| 6,363,632 B1 * | 4/2002 | Stentz et al. | 37/414 |
| 6,836,982 B1 | 1/2005 | Augustine | |
| 6,988,591 B2 * | 1/2006 | Uranaka et al. | 187/247 |
| 7,516,563 B2 | 4/2009 | Koch | |
| 7,756,624 B2 * | 7/2010 | Diekhans et al. | 701/50 |
| 8,639,393 B2 * | 1/2014 | Taylor et al. | 701/2 |
| 2002/0143461 A1 | 10/2002 | Burns et al. | |
| 2004/0068352 A1 | 4/2004 | Anderson | |
| 2004/0158355 A1 | 8/2004 | Holmqvist et al. | |
| 2006/0069472 A1 | 3/2006 | Makela | |
| 2006/0149465 A1 | 7/2006 | Park et al. | |
| 2008/0133128 A1 | 6/2008 | Koch | |
| 2008/0195270 A1 * | 8/2008 | Diekhans et al. | 701/26 |
| 2008/0208393 A1 * | 8/2008 | Schricker | 701/1 |
| 2008/0208415 A1 * | 8/2008 | Vik | 701/50 |
| 2009/0063031 A1 * | 3/2009 | Greiner et al. | 701/117 |
| 2009/0063222 A1 * | 3/2009 | Doan et al. | 705/7 |
| 2009/0216410 A1 * | 8/2009 | Allen et al. | 701/50 |
| 2010/0076640 A1 | 3/2010 | Maekawa et al. | |
| 2010/0131122 A1 * | 5/2010 | Dersjo et al. | 701/2 |
| 2012/0083968 A1 * | 4/2012 | Greiner et al. | 701/31.4 |

OTHER PUBLICATIONS

U.S. Patent Application of Bryan J. Everett et al. entitled "Machine Control System Having Autonomous Resource Queuing" filed Aug. 4, 2011.

U.S. Patent Application of Bryan J. Everett et al. entitled "Control System Having Tool Tracking" filed Aug. 4, 2011.

U.S. Patent Application of Bryan J. Everett et al. entitled "System for Automated Excavation Planning and Control" filed Aug. 4, 2011.

* cited by examiner

SYSTEM FOR AUTONOMOUS PATH PLANNING AND MACHINE CONTROL

RELATED APPLICATIONS

This application is based on and claims the benefit of priority from U.S. Provisional Application No. 61/418,335 by Bryan J. EVERETT, Andrew J. VITALE, Craig L. KOEHRSEN, and James D. HUMPHREY, filed Nov. 30, 2010, the contents of which are expressly incorporated herein by reference.

TECHNICAL FIELD

The present disclosure relates generally to an autonomous machine control system, and more particularly, to a system for autonomously planning travel paths and controlling mobile machines along the autonomously planned paths.

BACKGROUND

Machines such as haul trucks, loaders, dozers, motor graders, and other types of heavy machinery are used to perform a variety of tasks. During the performance of these tasks, the machines often operate in varying terrain, under erratic environmental conditions, in changing traffic situations, and with different sizes and types of loads. Because of the volatile conditions under which the machines operate, performance of a particular machine can vary greatly depending on the particular travel path followed by the machine at any given time. For example, a first potential travel path could allow for decreased fuel consumption of a particular haul truck, but also result in a longer or more congested trip. In contrast, if the same haul truck were to instead take a second potential travel path, the trip could be shorter, but also result in greater machine wear. Unfortunately, it may not always be easy for a human operator to properly plan a travel path that results in the accomplishment of a desired machine goal.

One attempt of improving travel path planning of a machine is described in U.S. Pat. No. 6,128,574 (the '574 patent) issued to Diekhans on Oct. 3, 2000. In particular the '574 patent describes a route planning system for an agricultural vehicle. The route planning system includes an electronic data processing unit configured to receive field specific data (e.g., coordinates for field edges, field hindrances, digital land relief, type of crop, soil properties, etc.) and vehicle specific data (e.g., geometric dimensions, maximum speed, fuel tank capacity, fuel cost, travel track dimension, etc.), and to generate a work path for the vehicle based on the data. The route planning system is configured to generate the work path based on at least one optimization criterion (e.g., shortest route, fastest route, fuel efficient route, safest route, ground conservation, etc.), and to subsequently guide the work vehicle along the work path.

Although the system of the '574 patent may provide some help in route planning and machine guidance, it may be less than optimal. In particular, the goals for a particular machine may change periodically, and the system of the '574 patent may not be configured to accommodate those changes. In addition, the system of the '574 patent may limited to single-use, single-machine, agricultural applications.

The disclosed control system is directed to overcoming one or more of the problems set forth above and/or other problems of the prior art.

SUMMARY OF THE INVENTION

In one aspect, the present disclosure is directed to a control system for use with a mobile loading machine operating at a first location of a worksite and a plurality of mobile haul machines configured to move material received at the first location to a second location of the worksite. The control system may include a plurality of control modules, each associated with one of the mobile loading machine and the plurality of mobile haul machines, and a worksite controller in communication with the plurality of control modules. The worksite controller may be configured to make a determination that a position of the mobile loading machine at the first location has changed, and to generate a new travel path for the plurality of mobile haul machines between the first location and the second location based on the determination. The worksite controller may also be configured to selectively communicate the new travel path to each of the plurality of control modules. The new travel path between the first and second locations may be automatically determined in accordance with at least one user-selected goal.

In another aspect, the present disclosure is directed to a computer readable medium having computer executable instructions for performing a method of controlling a plurality of mobile haul machines at a worksite. The method may include making a determination that a position of a mobile loading machine at a first location has changed, and generating a new travel path for the plurality of mobile haul machines from the first location to a second location based on the determination. The method may further include selectively communicating the travel path to each of the plurality of mobile haul machines. The new travel path between the first and second locations may be automatically generated in accordance with at least one user-selected goal.

In yet another aspect, the present disclosure is directed to a computer readable medium having computer executable instructions for performing a method of controlling a plurality of mobile haul machines at a worksite. The method may include receiving an input from an operator of a mobile loading machine indicative of a desire for generation of a new travel path for the plurality of mobile haul machines, and making a determination of a current position of the mobile loading machine at a first location based on the input. The method may further include generating the new travel path for the plurality of mobile haul machines from the first location to a second location based on the determination, the new travel path being generated in accordance with at least one user-selected goal. The method may additionally include autonomously controlling the plurality of mobile haul machines to follow the new travel path.

DETAILED DESCRIPTION

Figure 1:
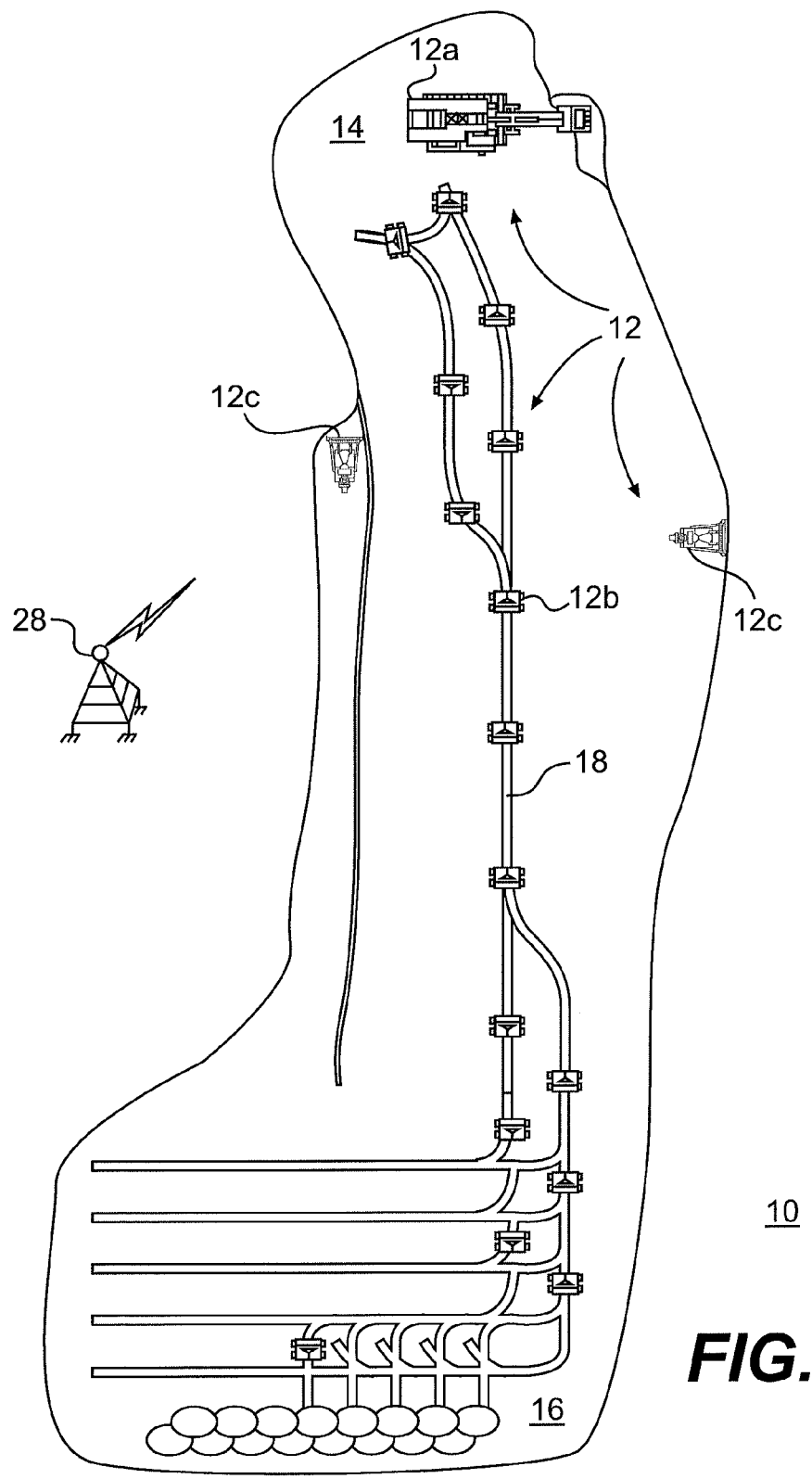
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, or any other type of operation that functions to alter the current geography at worksite 10.

Worksite 10 may include multiple locations designated for particular purposes. For example, a first location 14 may be designated as a load location at which a mobile loading machine 12a operates to fill multiple mobile haul machines 12b with material. A second location 16 may be designated as a dump location at which machines 12b discard their payloads. Machines 12b may follow a travel path 18 that generally extends between load and dump locations 14, 16. One or more other mobile dozing or grading machines 12c at worksite 10 may be tasked with clearing or leveling load location 14, dump location 16, and/or travel path 18 such that travel by other machines 12 at these locations may be possible. As machines 12 operate at worksite 10, the shape, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator. In the disclosed embodiment, at least some of machines 12 at worksite 10 are autonomously controlled.

Figure 2:
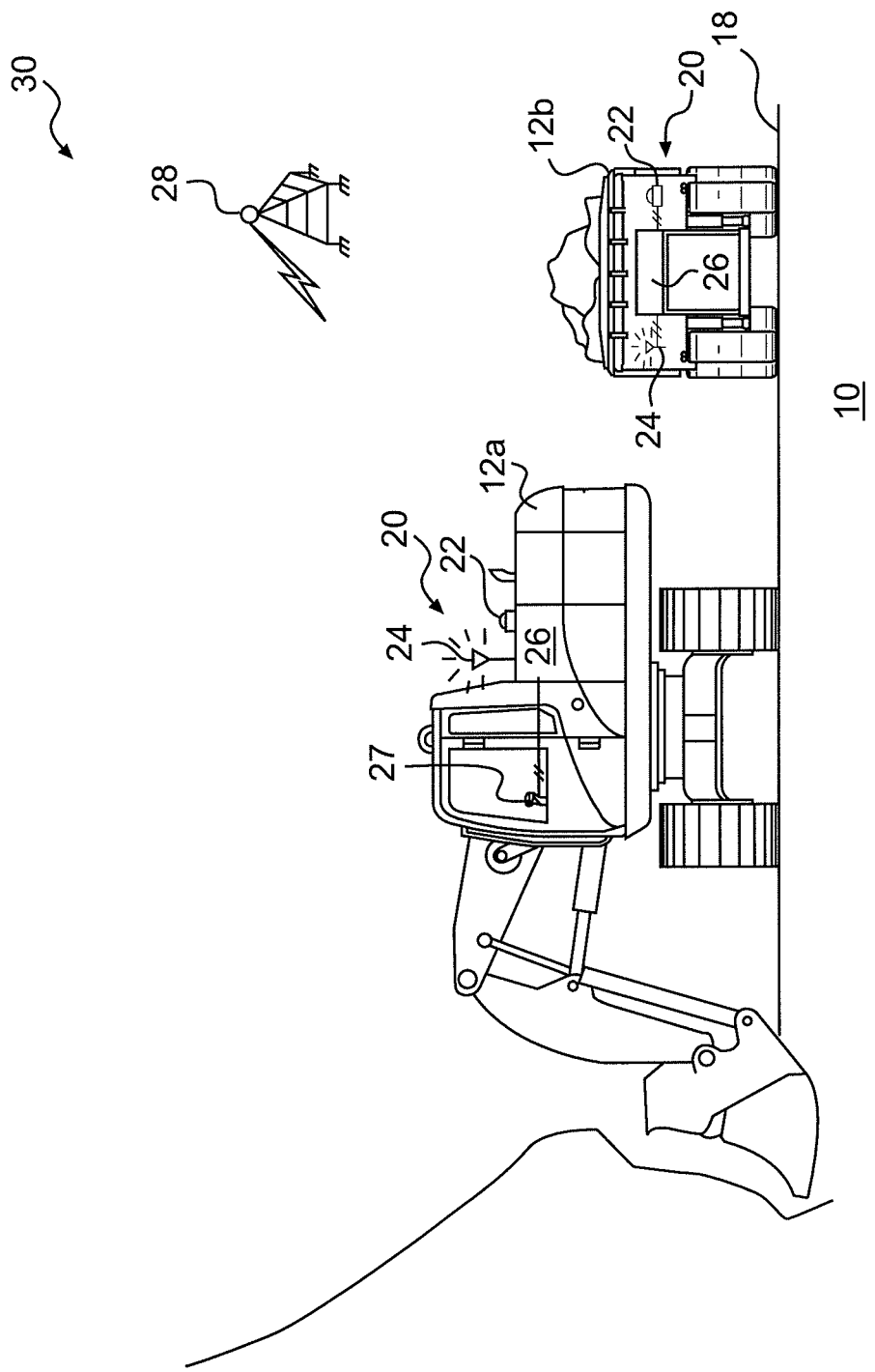
FIG. 2 is pictorial illustration of an exemplary disclosed control system that may be used at the worksite of FIG. 1.

As shown in FIG. 2, each machine 12 may be equipped with a control module 20 that facilitates or enhances autonomous and/or human control of machine 12. Control module 20 may include, among other things, a locating device 22, a communicating device 24, and an onboard controller (OC) 26 connected to locating device 22 and communicating device 24. When intended for use with a manually operated machine 12, control module 20 may also include one or more operator interface devices 27. Operator interface devices 27 may include, for example, an input device such as a joystick, keyboard, steering wheel, pedal, lever, button, switch, etc. Alternatively or additionally, operator interface devices 27 may include a display device such as a monitor, if desired.

Locating device 22 may be configured to determine a position of machine 12 and generate a signal indicative thereof. Locating device 22 could embody, for example, a Global Satellite System (GPS or GNSS) device, an Inertial Reference Unit (IRU), a local tracking system, a laser range finding device, an odometric or dead-reckoning device, or any other known locating device that receives or determines positional information associated with machine 12. Locating device 22 may additionally include an orientation sensor such as a laser-level sensor, a tilt sensor, an inclinometer, a radio direction finder, a gyrocompass, a fluxgate compass, or another device to facilitate heading and/or inclination detection, if desired. Locating device 22 may be configured to convey a signal indicative of the received or determined positional information to OC 26 for processing. It is contemplated that the location signal may also be directed to one or more of interface devices 27 (e.g., to the monitor) for display of machine location in an electronic representation of worksite 10, if desired.

Communicating device 24 may include hardware and/or software that enables sending of data messages between OC 26 and an offboard worksite controller (OWC) 28. OWC 28, together with each control module 20 of machines 12, may embody a control system 30. The data messages associated with control system 30 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communications device 24 to exchange information between OWC 28 and the components of control module 20.

Based on information from locating device 22 and instructions from OWC 28, each OC 26 may be configured to help regulate movements and/or operations of its associated machine 12 (e.g., movement of associated traction devices, work tools, and/or actuators; and operations of associated engines and/or transmissions). OC 26 may be configured to autonomously control these movements and operations or, alternatively, provide instructions to a human operator of machine 12 regarding recommended control. OC 26 may also be configured to send operational information associated with components of machine 12 offboard to OWC 28 via communicating device 24, if desired. This information may include, for example, the coordinates of machine 12, a traction device speed and/or orientation, tool and/or actuator positions, status information (e.g., temperatures, velocities, pressures, gear ratios, etc.), and other information known in the art.

OC 26 may embody a single or multiple microprocessors, field programmable gate arrays (FPGAs), digital signal processors (DSPs), etc., that include a means for controlling operations of machine 12 in response to operator requests, built-in constraints, sensed operational parameters, and/or communicated information from OWC 28. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

OWC 28 may include any means for monitoring, recording, storing, indexing, processing, and/or communicating various operational aspects of work worksite 10 and machine 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

OWC 28 may be configured to execute instructions stored on computer readable medium to perform methods of travel path planning for machines 12 at worksite 10. That is, as described above, the operation of machines 12 may cause changes to the geography of worksite 10 and, in order for machines 12, particularly those machines that are autonomously controlled, to adapt to the changing geography, travel path plans for machines 12 should also change to keep up with the changes in terrain. OWC 28 may execute instructions to perform a method of planning that generates travel paths 18 for machines 12, and communicates these travel paths 18 to the different control modules 20 for individual implementation.

The method of travel path planning may be associated with travel between load location 14 and dump location 16. Each time machine 12a changes its general position at load location 14, travel path 18 should also change to accommodate the movement of machine 12a. Accordingly, OWC 28 may initiate planning of travel path 18 when it is determined that the position of machine 12a at load location 14 has changed by at least a minimum amount. The minimum amount may be adjustable and set by an operator of machine 12a and/or a user of control system 30.

OWC 28 may automatically make the determination that machine 12a has changed by at least the minimum amount based on information provided by control module 20. For example, when locating device 22 of machine 12a generates a signal received by OWC 28 via communicating device 24 indicative of a new loading machine position substantially different from a previous loading machine position, OWC 28 may responsively initiate travel path planning. Alternatively, when a human operator of machine 12a manually provides input signaling that the loading machine position has changed and travel path planning is desired, OCW 28 may responsively initiate planning of travel path 18. The manual signal from the operator of machine 12a may be generated via interface device 27 and directed to OCW 28 via communicating device 24.

When generating plans for travel path 18, OCW 28 may consider, among other things, worksite conditions. The worksite conditions may include, for example, the terrain of worksite 10 (e.g., contour and composition), a traversable area at worksite 10 that has been cleared by machines 12c, the new loading machine position at load location 14, the coordinates of dump location 16, any known isolation spaces therebetween (i.e., spaces that include obstacles or hazards and should be avoided), and applicable speed or payload limits. OCW 28 may consider the terrain of worksite 10 because the terrain could vary dramatically and have a significant effect on the travel of machine 12. For example, the terrain of worksite 10 may be very steep and/or loose in some areas, which could affect a maximum load that machine 12 is capable of carrying without losing power, an amount of wheel torque that can be applied without causing wheel slip, or a maximum speed that provides adequate controllability. Similarly, worksite 10 could include large ruts or otherwise rough or uneven terrain in particular areas that make travel uncomfortable, damaging, or even impossible. OCW 28 may consider the traversable area of worksite 10 because worksite 10 could have a smaller cleared area at some locations than at other locations, thereby restricting an available foot print of travel path 18. The newly planned travel path 18 should extend from close proximity of the new loading machine position at load location 14 to dump location 16, while at the same time avoiding known isolation areas. Given these conditions, OCW 28 may be capable of generating multiple options for travel path 18.

OCW 28 may narrow the options for travel path 18 based on characteristics of machines 12 that intend to use travel path 18. These characteristics may include, for example, a turning radius, a vertical clearance, a width, a length, a height, a shape, an output capacity (i.e., torque and/or speed output), a tractive capacity, a braking capacity, a weight, and other similar attributes. For instance, travel path 18 should have a curvature that is greater than a minimum turn radius of machine 12, and a width at least as wide as machine 12. In addition, a slope of travel path 18 should be mild enough such that the heaviest loaded machine 12 with the lowest braking and torque capacity can still safely navigate the incline. In other words, travel path 18 should be designed to accommodate the least capable of machines 12 that intend to use travel path 18. Given these requirements, OCW 28, in some situations, may still be able to generate multiple options for travel path 18.

OCW 28 may base final selection of the multiple travel path options on goals set by a user of control system 30. The different goals may include, among other things, a shortest travel time between the new load location 14 and dump location 16, a shortest travel distance, operational costs, fuel economy, acceptable wear or damage to machine 12, maintenance of travel path 18, traffic congestion, desired travel path footprint, productivity, etc. For example, the user of control system 30 may choose fuel economy as a goal that is most important and, accordingly, OCW 28 may select the travel path option that is very level with firm underfooting and provides for the greatest fuel efficiency, even if that travel path option might result in a longer trip, increased machine damage, and increased travel path maintenance. In this manner, the selection of travel path 18 may be customizable by the user.

It is contemplated that the user of control system 30 may be allowed to choose multiple goals for use in selecting which travel path option to pursue. For example, the user may choose both fuel economy and travel path maintenance as important goals. In this example, OCW 28 may select a travel path option that is relatively smooth and level to provide increased fuel economy, but also with some lane overlapping (shown in FIG. 1) to reduce an overall space consumed by travel path 18 that requires maintenance. In this example, the travel path selected by OCW 28 may not be the most fuel efficient option or the option of least maintenance, but instead reflects in a compromise between the two goals.

OCW 28 may be configured to provide a weighting factor for the different goals selected by the user according to a priority placed on the goals. For example, the user may select fuel economy as the most important goal, with travel path maintenance as a goal of lesser importance. In this situation, if a trade-off between fuel economy and travel path maintenance exists, the travel path option providing greater fuel economy may be selected by OCW 28. It should be noted that, although OCW 28 has been described as being configured to generate multiple travel path options and then narrow the options based on machine characteristics, user goals, and weighting factors, it is contemplated that OCW 28 may alternatively implement a process of fewer steps to generate a single travel path option that simultaneously satisfies all applicable worksite, machine, and user requirements.

It is contemplated that the weighting factors applied by OCW 28 to the different user-selected goals may vary according to location at worksite 10. For example, the user of control system 30 may choose machine wear to be most important in a location near load location 14, traffic congestion to be most important near dump location 16, and travel speed or fuel economy to be most important therebetween. Accordingly, OCW 28 may generate a travel path option that reduces steering or stationary tire turning near load location 14, has a long straight middle portion with firm underfooting for high fuel efficiency, and widely spaced lanes near dump location 16 for decreased traffic congestion. This ability to further customize travel path 18 according to location at worksite 10 may help to improve performance of machines 12 in a manner most desired by the user of control system 30.

The travel path 18 generated by OCW 28 may be tailored for one particular machine 12b at worksite 10 or for all like machines 12b, as desired. That is, each time machine 12a changes position by a significant amount, OCW 28 could then be triggered to generate a specific travel path 18 for each individual machine 12b that best improves the performance of that particular machine 12b. Alternatively, OCW 28 could instead be triggered to generate a single travel path 18 for all like machines 12b that is usable until machine 12a again changes position at load location 14. By generating a single travel path 18 that is the same for all like machines 12b, a complexity of OCW 28 may be reduced.

After generating the appropriate travel path 18, OCW 28 may communicate that travel path 18 to all machines 12. In the case of autonomously controlled machines 12, control modules 20 of the corresponding machines 12 may be instructed by OCW 28 to regulate operations of machines 12 and follow the newly-generated travel path 18. In the case of manually controlled machines 12, control modules 20 of the corresponding machines 12 may cause travel path 18 to be displayed in the form of an electronic terrain map provided on one of interface devices 27 (i.e., on the monitor), with associated instructions for the machine operator. The electronic terrain map may be a compilation of data stored in the memory of OCW 28 and periodically updated with the changes made to travel path 18 and/or the locations of machines 12 provided by corresponding locating devices 22.

INDUSTRIAL APPLICABILITY

The disclosed control system may be applicable to a multi-machine operation where the machines repetitively traverse a common travel path. Although applicable to any type of machine, the disclosed control system may be particularly applicable to autonomously controlled machines where the machines are autonomously controlled to follow the travel path. The disclosed system may generate the travel path each time a desired position of the travel path changes (i.e., each time machine 12a moves by at least the minimum amount at load location 14), with characteristics of the travel path being based on worksite conditions, machine attributes, user goals, and customizable weighting factors.

Because control system 30 may be customizable, the user thereof may be able to improve operations at worksite 10 in a manner most desired by the user. Specifically, because goals for particular machines 12 and for particular users of control system 30 may change over time and control system 30 may be configured to generate travel paths 18 based on the changing goals, the user may be able to tailor performance of worksite 10. In addition the ability to choose the goals and adjust the corresponding weighting factors according to worksite locations, may further enhance user control over worksite performance.

It will be apparent to those skilled in the art that various modifications and variations can be made to the disclosed system. Other embodiments will be apparent to those skilled in the art from consideration of the specification and practice of the disclosed system. For example, it is contemplated that both ends (i.e., load location 14 and dump location 16) of travel path 18 may periodically change, if desired, and that OCW 28 may generate travel path 18 to accommodate both changes. It is intended that the specification and examples be considered as exemplary only, with a true scope being indicated by the following claims and their equivalents.

What is claimed is:

1. A control system for use with a mobile loading machine operating at a first location of a worksite and a plurality of mobile haul machines configured to move material received at the first location to a second location of the worksite, the control system comprising:
   a plurality of control modules, each associated with one of the mobile loading machine and the plurality of mobile haul machines;
   a worksite controller in communication with the plurality of control modules, the worksite controller being configured to:
   make a determination that a position of the mobile loading machine at the first location has changed;
   generate a new travel path for the plurality of mobile haul machines between the first location and the second location based on the determination; and
   selectively communicate the new travel path to each of the plurality of control modules,
   wherein the new travel path between the first and second locations is automatically determined in accordance with a plurality of user-selected goals each having a user-defined weighting factor, wherein the weighting factors of the plurality of user selected goals vary at different locations of the worksite; and
   the worksite controller is configured to determine the new travel path in accordance with the weighting factor of each of the plurality of user-selected goals.

2. The control system of claim 1, wherein the plurality of user-selected goals are associated with at least one of operational cost, machine maintenance, productivity, travel time, fuel economy, and travel footprint.

3. The control system of claim 1, wherein the worksite controller includes an electronic terrain map of the worksite stored in memory.

4. The control system of claim 3, wherein:
   each of the plurality of control modules is configured to track movement of a corresponding one of the mobile loading machine and the plurality of mobile haul machines; and
   the electronic terrain map is automatically updated based on the tracked movement.

5. The control system of claim 1, wherein the new travel path is generated based further on one or more of an available travel area, an isolation area, a worksite contour, and a worksite composition.

6. The control system of claim 5, wherein the new travel path is generated based further on one or more of a machine turning radius, a machine output capacity, a machine weight, a machine size, and a machine shape.

7. The control system of claim 1, wherein the new travel path is the same for more than one of the plurality of mobile haul machines, the new travel path being based on a least capable machine of the more than one of the plurality of mobile haul machines.

8. The control system of claim 1, wherein the one of the plurality of control modules associated with the mobile loading machine is configured to:
   determine a position of the mobile loading machine; and
   automatically communicate the position of the mobile loading machine to the worksite controller based on a change in the position.

9. The control system of claim 1, wherein the one of the plurality of control modules associated with the mobile loading machine is configured to:
   determine a position of the mobile loading machine;
   receive an input from an operator indicative of a desire for generation of the new travel path; and
   communicate the position of the mobile loading machine to the worksite controller based on the input.

10. The control system of claim 1, wherein at least one of the plurality of control modules is configured to autonomous control at least one of the plurality of mobile haul machines to follow the new travel path.

11. A non-transitory computer readable medium having computer executable instructions for performing a method of controlling a plurality of mobile haul machines at a worksite, the method comprising:
   making a determination that a position of a mobile loading machine at a first location has changed;

generating a new travel path for the plurality of mobile haul machines from the first location to a second location based on the determination;

selectively communicating the travel path to each of the plurality of mobile haul machines, wherein the new travel path between the first and second locations is automatically generated in accordance with a plurality of user-selected goals each having a user-defined weighting factor, wherein the weighting factors of the plurality of user selected goals vary at different locations of the worksite; and determining the new travel path in accordance with the weighting factor of each of the plurality of user-selected goals.

12. The non-transitory computer readable medium of claim 11, wherein generating the new travel path includes generating the new travel path based further on one or more of an available travel area, an isolation area, a worksite contour, and a worksite composition.

13. The non-transitory computer readable medium of claim 12, wherein generating the new travel path includes generating the new travel path based further on one or more of a machine turning radius, a machine output capability, a machine weight, a machine size, and a machine shape.

14. The non-transitory computer readable medium of claim 11, wherein the plurality of user-selected goals are associated with at least one of operational cost, machine maintenance, productivity, travel time, fuel economy, and travel footprint.

15. The non-transitory computer readable medium of claim 11, wherein the method further includes receiving an operator input indicative of a desire for generation of the new travel path, wherein determination that the position of the mobile loading machine at the first location has changed is based on the operator input.

16. A non-transitory computer readable medium having computer executable instructions for performing a method of controlling a plurality of mobile haul machines at a worksite, the method comprising:

receiving an input from an operator of a mobile loading machine indicative of a desire for generation of a new travel path for the plurality of mobile haul machines;

making a determination of a current position of the mobile loading machine at a first location based on the input;

generating the new travel path for the plurality of mobile haul machines from the first location to a second location based on the determination, the new travel path being generated in accordance with a plurality of user-selected goals each having a user-defined weighting factor, wherein the weighting factors of the plurality of user selected goals vary at different locations of the worksite;

determining the new travel path in accordance with the weighting factor of each of the plurality of user-selected goals; and and autonomously controlling the plurality of mobile haul machines to follow the new travel path.

\* \* \* \* \*

UNITED STATES PATENT AND TRADEMARK OFFICE
CERTIFICATE OF CORRECTION

PATENT NO. : 8,868,302 B2
APPLICATION NO. : 13/198428
DATED : October 21, 2014
INVENTOR(S) : Everett et al.

Page 1 of 1

It is certified that error appears in the above-identified patent and that said Letters Patent is hereby corrected as shown below:

In the claims

Column 10, line 25, Claim 16, delete "; and and" and insert -- ; and --.

Signed and Sealed this
Twenty-fourth Day of November, 2015

Michelle K. Lee
*Director of the United States Patent and Trademark Office*